United States Patent
Lee et al.

(10) Patent No.: US 10,635,278 B2
(45) Date of Patent: Apr. 28, 2020

(54) APPARATUS AND METHOD FOR CONTROLLING DISPLAY OF VEHICLE, AND VEHICLE SYSTEM

(71) Applicants: HYUNDAI MOTOR COMPANY, Seoul (KR); KIA MOTORS CORPORATION, Seoul (KR)

(72) Inventors: Hye Jin Lee, Seoul (KR); Sang Woo Ji, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 26 days.

(21) Appl. No.: 16/100,552

(22) Filed: Aug. 10, 2018

(65) Prior Publication Data
US 2019/0187883 A1  Jun. 20, 2019

(30) Foreign Application Priority Data

Dec. 14, 2017 (KR) .......................... 10-2017-0171838

(51) Int. Cl.
| | |
|---|---|
| *G06F 3/0484* | (2013.01) |
| *G02B 27/01* | (2006.01) |
| *B60W 50/14* | (2020.01) |
| *G06K 9/00* | (2006.01) |
| *G06F 3/0481* | (2013.01) |
| *G06F 3/01* | (2006.01) |

(52) U.S. Cl.
CPC ......... *G06F 3/04845* (2013.01); *B60W 50/14* (2013.01); *G02B 27/01* (2013.01); *G02B 27/0101* (2013.01); *G06F 3/013* (2013.01); *G06F 3/0481* (2013.01); *G06F 3/04815* (2013.01); *G06F 3/04817* (2013.01); *G06K 9/00805* (2013.01); *G02B 2027/014* (2013.01); *G02B 2027/0138* (2013.01)

(58) Field of Classification Search
CPC ..................................................... B60W 50/14
See application file for complete search history.

(56) References Cited

FOREIGN PATENT DOCUMENTS

| JP | 2010-149580 A | 7/2010 |
|---|---|---|
| KR | 10-2007-0056898 A | 6/2007 |
| KR | 10-2015-0042478 A | 4/2015 |
| KR | 10-2015-0094381 A | 8/2015 |

*Primary Examiner* — Gustavo Polo
(74) *Attorney, Agent, or Firm* — Brinks Gilson & Lione

(57) ABSTRACT

An apparatus and a method for controlling a display of a vehicle is provided. The apparatus includes: a detector to detect at least one background element on a head-up display and detect additional information and color information of the at least one detected background element, and a determination device. When the additional information of the detected background element is matched with the head-up display, the determination device compares color information of the a graphic user interface (GUI) corresponding to the additional information with the color information of the detected background element. And an image correcting device of the apparatus corrects a color of an element of the GUI based on a comparison result, and an output controller outputs a corrected GUI corresponding to the additional information and displays the corrected GUI on the head-up display.

21 Claims, 11 Drawing Sheets

APPARATUS AND METHOD FOR CONTROLLING DISPLAY OF VEHICLE, AND VEHICLE SYSTEM

CROSS-REFERENCE TO RELATED APPLICATION

This application claims priority to and the benefit of Korean Patent Application No. 10-2017-0171838, filed on Dec. 14, 2017, which is incorporated by reference in its entirety.

FIELD

The present disclosure relates to an apparatus and a method for controlling a display of a vehicle, and a vehicle system.

BACKGROUND

The statements in this section merely provide background information related to the present disclosure and may not constitute prior art.

A head-up display projects a GUI (Graphic User Interface) guiding the forward situation to the driver's gaze position in the vehicle while driving the vehicle so that the driver can recognize the forward situation more easily.

Then, the head-up display may display not only a background element for a road but also a background element for an object, such as a front vehicle, a pedestrian, and/or an obstacle.

Further, various forms of GUIs may be displayed on the head-up display in which a plurality of background elements are mixed to be displayed.

However, we have discovered that when the color of the GUI is similar to the colors of the background elements or similar to the mixed colors of the plurality of background elements, the visibility of the GUI may deteriorate. As an example, when the color of the road is a bright color or a white vehicle is present on the front side, it is not easy to identify a GUI having a white periphery on a head-up display.

SUMMARY

The present disclosure provides an apparatus and a method for controlling a display of a vehicle, which improve a visibility of a GUI by correcting a color of a periphery of the GUI based on colors of background elements on a head-up display or a mixed color of the background elements and/or an intensity of external illumination and displaying the corrected GUI on the head-up display, and a vehicle system.

The present disclosure also provides an apparatus and a method for controlling a display of a vehicle, which improves an aesthetic aspect of a GUI by adding an effect image having a specific color to a periphery of the GUI based on colors of background elements on a head-up display or a mixed color of the background elements and/or an intensity of external illumination.

The technical objects of the present disclosure are not limited to the above-mentioned one, and the other unmentioned technical objects will become apparent to those skilled in the art from the following description.

In accordance with an aspect of the present disclosure, there is provided an apparatus for controlling a display of a vehicle. The apparatus may include: a detector configured to detect at least one background element on a head-up display and detect additional information and color information of the at least one detected background element; a determination device configured to, when the additional information of the detected background element is matched with the head-up display, compare color information of a graphic user interface (GUI) corresponding to the additional information of the detected background element with the color information of the detected background element; an image correcting device configured to correct a color of at least one element of the GUI based on a comparison result; and an output controller configured to output a corrected GUI corresponding to the additional information. The corrected GUI includes the element having the corrected color, and the output controller is configured to display the corrected GUI on the head-up display.

The GUI may include a GUI element corresponding to a peripheral area of a GUI image, and the image correcting device may correct a color of the GUI element corresponding to the peripheral area.

The GUI may include a GUI image, and a GUI element corresponding to a peripheral area of the GUI image, and the image correcting device may correct a color of the GUI element.

The image correcting device may correct the color of the at least one element of the GUI when a difference between the GUI color information of the additional information of the detected background element and the color information of the detected the background element is within a reference range.

The image correcting device may correct a color of at least one element of the GUI based on color information of the at least one background element.

The image correcting device may correct a color of at least one element of the GUI based on information on a mixed color of at least two background elements.

The image correcting device may correct a color of at least one element of the GUI by adding an effect image of a color contrasted with the color of the detected background element to the GUI.

The detector may detect a road image from a front image and detects color information of a road from the road image.

The detector may detect an object image from the front image and detects color information of an object from the object image.

The additional information may include at least one of progress state information of a road, object detection guide information, and travel guide information of the vehicle.

The detector may detect additional information on the background element from at least one sensor or a navigation system.

The detector may detect information on an intensity of external illumination, and the image correcting device may correct a color of at least one element of the GUI based on at least one of color information of the GUI and the background element and information on an intensity of external illumination.

In accordance with another aspect of the present disclosure, there is provided a method for controlling a display of a vehicle. The method may include: detecting, by a detector, a background element on a head-up display and detecting additional information and color information of the detected background element; when the additional information of the detected background element is matched with the head-up display, comparing, by a determination device, color information of the GUI corresponding to the additional information of the detected background element with the color information of the detected background element; correcting, by an image correcting device, a color of an element of the GUI based on a comparison result; and displaying, by an output controller, a corrected GUI including the corrected color on the head-up display.

The GUI may include a GUI element corresponding to a peripheral area of a GUI image, and the correcting of the color may include correcting the color of the GUI element.

The GUI may include a GUI image, and a GUI element corresponding to a peripheral area of the GUI image, and the correcting of the color may include correcting the color of the GUI element corresponding to the peripheral area.

The correcting of the color may include correcting a color of at least one element of the GUI when a difference between the color of the GUI and the color of the background element is within a reference range.

The correcting of the color may include correcting a color of at least one element of the GUI with a color contrasted with the color of the background element.

The correcting of the color may include correcting a color of at least one element of the GUI based on color information of the at least one background element.

The correcting of the color may include correcting a color of at least one element of the GUI based on information on a mixed color of at least two background elements.

The correcting of the color may include adding an effect image of a color contrasted with a color of the background element to the GUI.

The detecting of the additional information and the color information may include detecting a road image from a front image, and detecting color information of the road from the road image.

The detecting of the additional information and the color information may include detecting an object image from a front image of the vehicle, and detecting color information of an object from the object image.

The detecting of the additional information and the color information may include detecting additional information on the background element from at least one sensor or a navigation system.

The method may further include detecting information on an intensity of external illumination, and the correcting of the color of the GUI may include correcting a color of at least one element of the GUI based on at least one of color information of the GUI and the background element and information on an intensity of external illumination.

In accordance with another form of the present disclosure, there is provided a vehicle system including a head-up display, and a display control apparatus configured to detect additional information and color information of at least one background element on the head up display. When the additional information on the detected background element is matched with the head-up display, the display control apparatus corrects a color of at least one element of a GUI corresponding to the additional information by comparing color information of the at least one element of the GUI with the color information of the detected background element.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
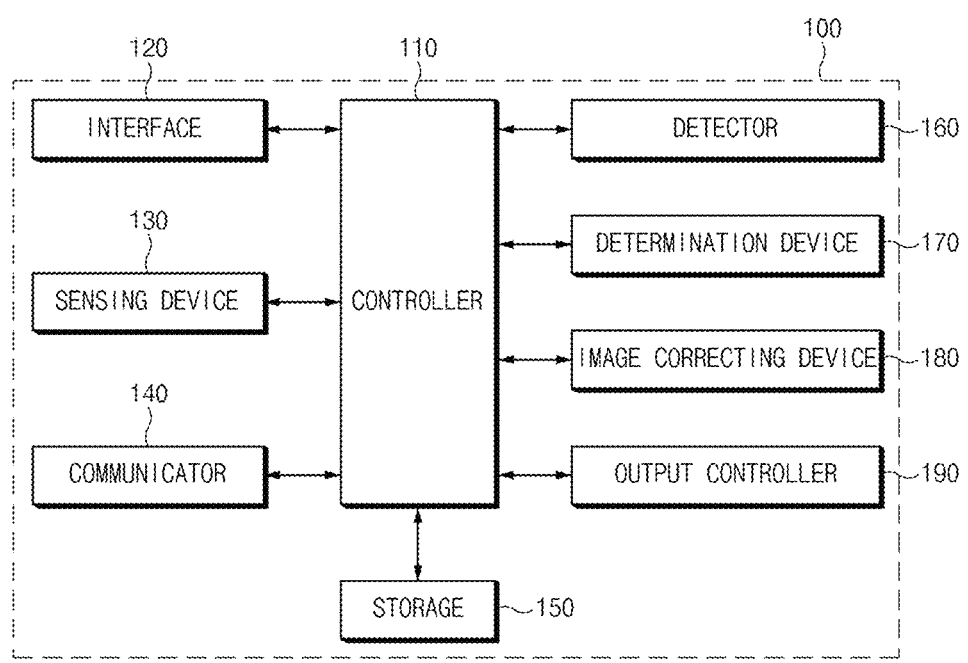
FIG. 1 is a diagram illustrating a configuration of a vehicle display control apparatus.

The drawings described herein are for illustration purposes only and are not intended to limit the scope of the present disclosure in any way.

DETAILED DESCRIPTION

The following description is merely exemplary in nature and is not intended to limit the present disclosure. Hereinafter, exemplary forms of the present disclosure will be described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. The terms are provided only to distinguish the elements from other elements, and the essences, sequences, orders, and numbers of the elements are not limited by the terms. In addition, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

FIG. 1 is a diagram illustrating a configuration of a vehicle display control apparatus in one form of the present disclosure.

Referring to FIG. 1, the apparatus 100 may include a controller 110, an interface 120, a sensing device 130, a communicator 140, a storage 150, a detector 160, a determination device 170, an image correcting device 180, and an output controller 190. Here, the controller 110, the detector 160, the determination device 170, the image correcting device 180, and the output controller 190 of the apparatus 100 may be realized by at least one processor.

The control unit 110 may process signals delivered between the elements of the apparatus 100.

The interface 120 may include an input unit that receives a control command from a driver, and an output unit that outputs an operation state and a result of the vehicle display control apparatus 100.

Here, the input unit may include a key button, and may include a mouse, a joystick, a jog shuttle, and a stylus pen. Further, the input unit may include a soft key that is embodied on a display.

The output unit may include a display, and may include a voice output unit such as a speaker. Then, when a touch sensor, such as a touch film, a touch sheet, a touch pad, is provided in the display, the display may be operated as a touch screen, and may be embodied in a form in which an input unit and an output unit are integrated. As an example, the display may include a head-up display (HUD) 15.

The sensing device 130 may include one or more sensors that detect information on the front side of the vehicle 10. As an example, the sensing device 130 may include at least one of a camera, a radar device, and a navigation sensor.

As an example, the sensor 130 may detect information on an object on the front side of the vehicle 10, for example, information on a front vehicle, a pedestrian, and/or an obstacle on the front side. Further, the sensing device 130 may detect information on a road on the front side of the vehicle 10. Then, the sensing device 130 may detect information on a color of a road and/or an object detected from the front side of the vehicle 10.

The communicator 140 may include a communication module that supports a communication interface with electronic components and/or control units provided in the vehicle 10. As an example, the communication module may be connected to a navigation system provided in the vehicle 10 through communication to receive host vehicle location information, destination information, travel route information and/or surrounding situation information from the navigation system.

Further, the communication module may be connected to a head-up display (HUD) 15 in the vehicle 10 through communication to transmit GUI image information display on a screen of the head-up display (HUD) 15.

Here, the communication module may include a module that supports network communication of the vehicle, such as controller area network (CAN) communication, local interconnect network (LIN), or Flex-Ray communication.

Further, the communication module may include a module for wireless internet connection or a module for short range communication. Here, the wireless internet technology may include wireless LAN (WLAN), wireless broadband (WiBro), Wi-Fi, or world interoperability for microwave access (WiMax), and the short range communication technology may include Bluetooth, ZigBee, ultra-wideband (UWB), radio frequency identification (RFID), and infrared data association (IrDA).

The storage unit 150 may store data and/or algorithms that are desired for operating the vehicle display control apparatus 100.

The storage 150 may store information detected by the sensing device 130, and may store information received from the navigation system through the communicator 140. Further, the storage 150 may determine whether the detected information is matched with the screen of the head-up display (HUD) 15, may constitute a graphic user interface (GUI), and may store a command and/or an algorithm for correcting a color of at least one of the GUI.

Here, the storage unit 150 may include storage media, such as a random access memory (RAM), a static random access memory (SRAM), a read-only memory (ROM), a programmable read-only memory (ROM), and an electrically erasable programmable read-only memory (EEPROM).

The detector 160 may detect information on one or more background elements from the information on the front side of the vehicle 10 obtained from the sensing device 130.

Then, the detector 160 may detect information on the road on the front side of the vehicle. As an example, the detector 160 may detect an image of the road from a front image captured by a front camera of the vehicle. Here, the detector 160 may detect information on a color of the road from the detected image of the road. Further, the detector 160 may detect information on a progress situation of the front road based on the information received from the one or more sensors and/or the navigation system.

Further, the detector 160 may detect information on an object on the front side of the vehicle 10, for example, information on a front vehicle, a pedestrian, and/or an obstacle on the front side. As an example, the detector 160 may detect an image of the object from a front image captured by a front camera of the vehicle. Here, the detector 160 may detect information on a color of the object from the detected image of the object. Further, the detector 160 may detect information on a location of the front object from the one or more sensors of the vehicle.

Further, the detector 160 may detect information on an intensity of external illumination from a sensor of the vehicle.

The output control unit 190 may display information on one or more background elements on the screen of the head-up display (HUD) 15. Here, the background elements may correspond to a road and an object, such as a front vehicle, a pedestrian and/or an obstacle, displayed on the screen of the head-up display (HUD) 15 at the current position of the vehicle 10, or an image thereof. Further, the background elements may include information of the current position of the vehicle 10.

Then, the output control unit 190 constitutes a GUI based on the road information and/or object information detected by the detector 160.

If additional information on one or more background elements on the head-up display (HUD) 15 is detected, the determination device 170 may determine whether the detected additional information is to be matched with the screen of the head-up display (HUD) 15.

As an example, if additional information on the road and/or the object is detected from the front side of the vehicle 10, the determination device 170 may determine whether the GUI corresponding to the detected additional information is to be matched with the screen of the head-up display (HUD) 15.

If it is determined that the detected additional information is matched with the screen of the head-up display (HUD) 15, the output controller 190 outputs a GUI corresponding to the additional information of the corresponding background element. In one form, the GUI may include information that guides a progress state of a road on the front side according to the shape of the road. Further, the GUI may guide or warn an object that is detected from the front side of the vehicle 10, or may include travel guide information such as deceleration or change of a lane according to a location of the object.

In one form, the determination device 170 compares information on a color of the GUI constituted by the output controller 190, and information of the colors of the background elements displayed on the screen of the head-up display (HUD) 15 and/or information on the mixed color of the plurality of background elements. When a color difference between the color information of the GUI and the colors and/or the mixed color of the background elements is within a preset range, the determination device 170 determines that a color of at least one element of the GUI has to be corrected. One form of the elements of the GUI will be described with FIG. 2.

In another form, the determination device 170 may determine correction of a color of at least one element of the GUI based on information of the intensity of external illumination. As an example, the determination device 170 may determine that a color of at least one element of the GUI has to be corrected when the intensity of external illumination is equal to or greater than a reference intensity of illumination.

Of course, the determination device 170 may determine correction of a color of at least one element of the GUI by reflecting both the intensities of external illumination and the color difference between the GUI and the background element.

Accordingly, the image correcting device 180 corrects a color of one element of the GUI outputted by the output controller 190. Here, the image correcting device 180 may correct a color of a peripheral area of a GUI image or colors of the GUI image and the peripheral area, or may add an effect image having a specific color to the GUI image and/or the periphery.

The output controller 190 displays the GUI corrected by the image correcting device 180 on the screen of the head-up display (HUD) 15. Then, the output controller 190 may display the corrected GUI on the mixed background elements of the head-up display (HUD) 15.

Accordingly, FIGS. 2 to 5D will be referenced for exemplary forms of correcting at least one element of the GUI displayed the head-up display (HUD) 15.

Figure 2:
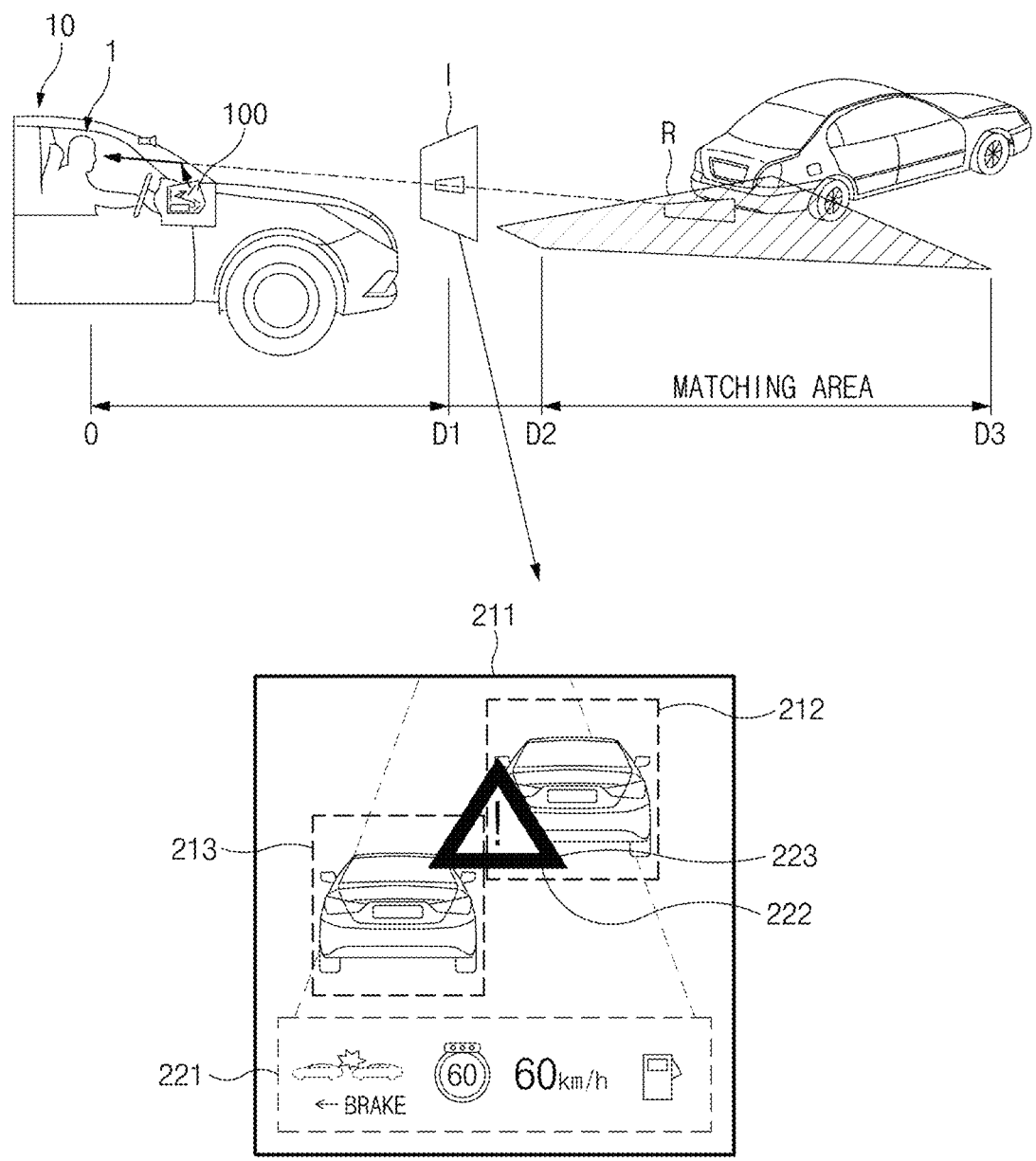
FIG. 2 is view illustrating obtaining a matching area and a screen of a head-up display displaying an image based on the matching area.

First, FIG. 2 illustrates the screen of the head-up display (HUD) 15.

Referring to FIG. 2, the vehicle head-up display control apparatus 100 may obtain information on a preset matching area "R" by using a camera and/or at least one sensor in the vehicle, and may constitute an image "I" displayed on the screen of the head-up display (HUD) based on the information obtained from the matching area R.

The screen of the head-up display HUD is projected to a front glass window of the vehicle, and then, a projection location may be adjusted based on the height of the eyes of the driver 1.

The screen of the head-up display (HUD) may include one or more background elements. In the form of FIG. 2, the head-up display (HUD) may include a first background element 211 corresponding to a road, a second background element 212 corresponding to a first vehicle, and a third background element 213 corresponding to a second vehicle.

Then, the first to third background elements 211 to 213 may be mixed with each other to be displayed.

Further, the screen of the head-up display (HUD) may include one or more GUI elements. Here, the GUI elements may include an image of the GUI and the GUI elements corresponding to the peripheral area of the GUI image.

For example, the screen of the head-up display (HUD) may include a first GUI element 221 corresponding to a GUI image including travel information of the vehicle, and a second GUI element 222 corresponding to a GUI image including notification or warning information. Further, the screen of the head-up display (HUD) may include a third GUI element 223 corresponding to the peripheral area of the GUI image.

Accordingly, the image correcting device 180 may correct the color of the third GUI element 223 based on the colors of the background elements corresponding to the areas in which the first GUI element 221, the second GUI element 222, and the third GUI element 223 are displayed, and/or the mixed color. Further, the image correcting device 180 may correct the color of the third GUI element 223, and/or at least one color of the first GUI element 221 and the second GUI element 222.

Accordingly, the output controller 190 may displays the GUI including the GUI element, the color of which has been corrected by the image correcting device 180, on the screen of the head-up display (HUD).

Figure 3A:
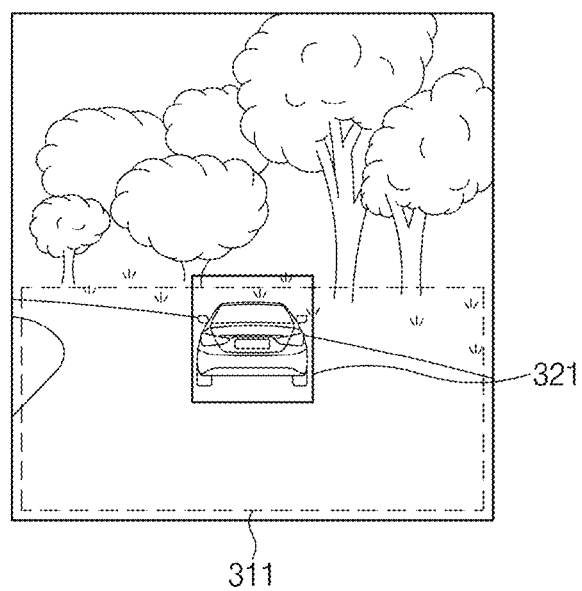
FIGS. 3A-3C are views illustrating a first form of correcting elements of a GUI.
Figure 3B:
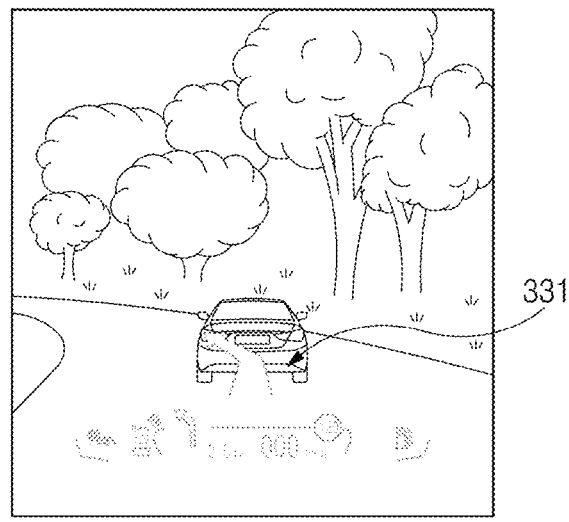
Figure 3C:
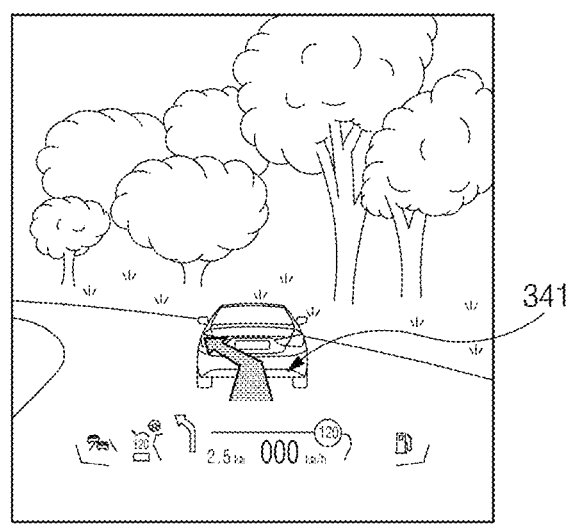

FIGS. 3A to 3C illustrate a first form of correcting one element of a GUI, where a GUI guides a road progress state while a background element of a road and a background element of a front vehicle are mixed to be displayed on a screen of a head-up display.

As illustrated in FIG. 3A, the detector 160 may detect a road image 311 from a front image, and may extract the detected road image 311 as a background element. Then, the detector 160 may detect color information from the detected road image 311.

Further, the detector 160 may detect a front vehicle image 321 from the front image, and may extract a front vehicle from the front vehicle image 321 as a background element. Then, the detector 160 may detect color information from the detected front vehicle image 321.

The output controller 190 matches additional information on the road and the background element of the vehicle extracted in FIG. 3A, for example, information that guides a road progress direction with the mixed background element to display the matched result on the screen of the head-up display (HUD) 15. Then, as illustrated in FIG. 3B, the output controller 190 may constitute a GUI 331 that guides a road progress direction on the front side to display the constituted GUI 331 together on the screen of the head-up display (HUD) 15.

In FIG. 3B, because the color of the GUI 331 and the colors of the road and the front vehicle are similar, the visibility of the GUI 331 deteriorates when the corresponding GUI 331 is directly displayed on the screen of the head-up display (HUD) 15.

In this case, as illustrated in FIG. 3C, the image correcting device 180 corrects the color of the peripheral area of the GUI 341 in consideration of the background element, that is, the colors of the road and the front vehicle. Here, as illustrated in FIG. 3C, the image correcting device 180 may improve an aesthetic aspect for the GUI 341 by adding a glowing effect image having a color that is contrasted with the colors of the road and the front vehicle to the peripheral area of the GUI 341.

In this way, the vehicle display control apparatus 100 improves the visibility of the corresponding GUI 341 due to the correction of the color of the peripheral area of the GUI 341 displayed on the screen of the head-up display (HUD) 15.

Figure 4A:
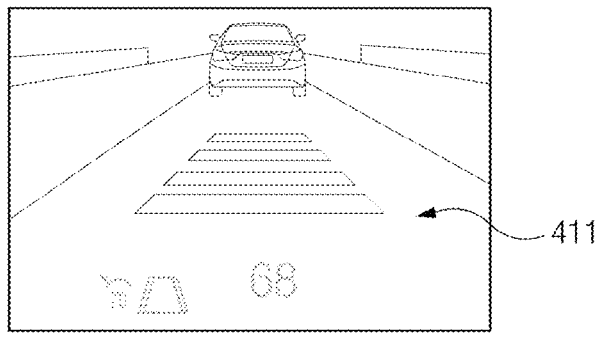
FIGS. 4A-4B are views illustrating a second from of correcting a GUI.
Figure 4B:
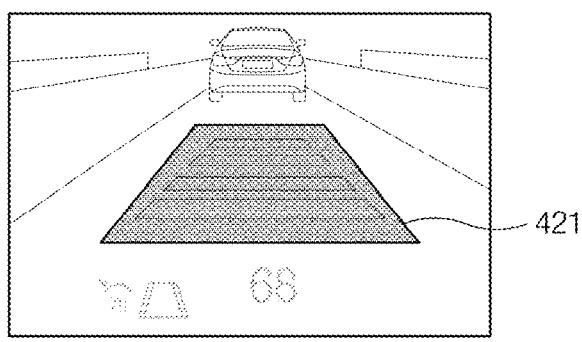

FIGS. 4A and 4B illustrate a second form of correcting a GUI that guides vehicle travel information according to detection of an object while the background element of the road and the background element of the front object are mixed to be displayed on the screen of the head-up display.

As illustrated in FIG. 4A, the output controller 190 may constitute a GUI 411 that guides deceleration information when matching of travel guide information with the screen of the head-up display (HUD) 15 according to detection of an object is desired while a plurality of background elements are mixed to display the constituted GUI 411 together on the screen of the head-up display (HUD) 15.

FIG. 4A, the GUI 411 that guides deceleration information is matched with a road, and then, the color of the road and the color of the GUI 411 are similar and the intensities of external illumination of the road and the GUI 411 are high so that the visibility of the GUI 411 displayed on the screen of the head-up display (HUD) deteriorates.

In this case, the image correcting device 180 may correct the color of the peripheral area of the corresponding GUI 411 in consideration of the color and the intensity of external illumination of the road. Here, as illustrated in FIG. 4B, the image correcting device 180 may add an effect image 421 contrasted with the color of the road and having a color of a dark tone to the corresponding GUI 411. Here, a transparency of the effect image 421 may be a reference value or more.

In this way, the vehicle display control apparatus 100 improves the visibility of the corresponding GUI 411 by adding the effect image 421 to the GUI 411 displayed on the screen of the head-up display (HUD) 15.

In addition, the vehicle display control apparatus 100 may variously correct a color of at least one element of the GUI according to a color of a road, a color of an object, a color of the GUI, a color of an area with which the GUI is matched, a situation of the road, and/or an intensity of illumination of the periphery.

Figure 5A:
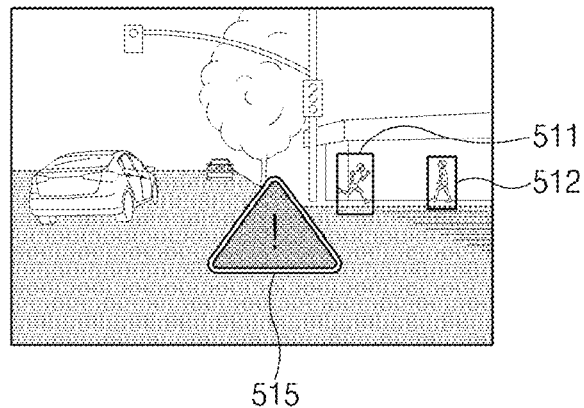
FIGS. 5A-5F are views illustrating other forms of correcting GUI by an operation of the vehicle display control apparatus.
Figure 5B:
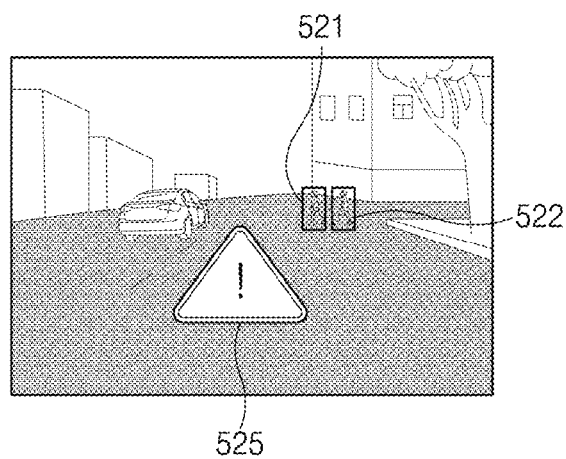

First, FIGS. 5A and 5B illustrate another form in which a color of the GUI is differently corrected according to a color and an intensity of illumination of a background element.

Referring to FIG. 5A, the output controller 190 may constitute a GUI that warns pedestrians 511 and 512 if the pedestrians 511 and 512 are detected from the front side. Then, because the color of the road displayed on the screen of the head-up display (HUD) 15 is a bright color and the intensity of illumination of the periphery exceeds a reference value, the image correcting device 180 may correct the color of the GUI image and the color of the peripheral area to a color contrasted with the color of the road and having a tone that is darker than the intensity of illumination of the periphery.

Accordingly, the output controller 190 may allow the driver to easily recognize the GUI 515 that warns a pedestrian by displaying the GUI 515 in which the colors of the GUI image and the peripheral area have been corrected on the screen of the head-up display (HUD) 15.

Referring to FIG. 5B, the output controller 190 may constitute a GUI that warns pedestrians 521 and 522 if the pedestrians 511 and 512 are detected from the front side. Then, because the color of the road displayed on the screen of the head-up display (HUD) 15 is a dark color and the intensity of illumination of the periphery is less than the reference value, the image correcting device 180 may correct the color of the GUI image and the color of the peripheral area to a color contrasted with the color of the road and having a tone that is brighter than the intensity of illumination of the periphery.

Accordingly, the output controller 190 may allow the driver to easily recognize the GUI 525 that warns a pedestrian by displaying the GUI 525 in which the colors of the GUI image and the peripheral area have been corrected on the screen of the head-up display (HUD) 15.

Figure 5C:
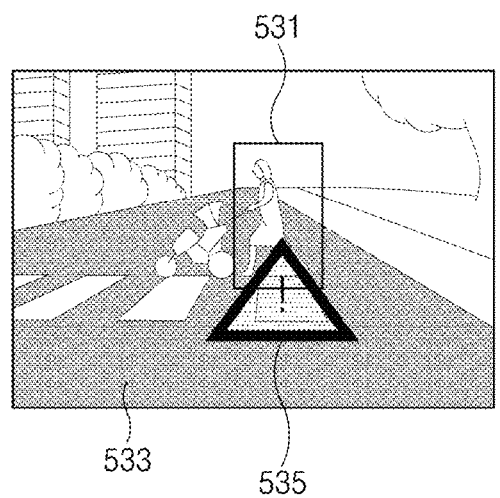

FIG. 5C illustrates another form of differently correcting a color of a periphery of the GUI according to the color of a background element located in an area with which the GUI is matched.

Referring to FIG. 5C, the output controller 190 may constitute a GUI 535 that guides pedestrian detection information if the pedestrian 531 are detected from the front side. Here, because the pedestrian 531 located in an area, with which the GUI 535 is matched on the screen of the head-up display (HUD) 15 whereas the color of the road 533 is a dark color, the image correcting device 180 may correct the color of the peripheral area of the GUI 535 to a black color contrasted with the pedestrian 531 and the road 533.

Accordingly, the output controller 190 may allow the driver to easily recognize the GUI 535 that warns a pedestrian by displaying the corrected GUI 515 on the screen of the head-up display (HUD) 15.

Figure 5D:
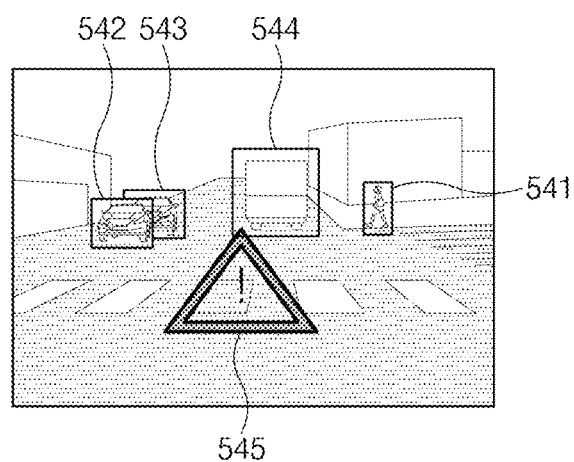

FIG. 5D illustrates one form of differently correcting a color of a peripheral area of the GUI according to the color of the background element located in an area with which the GUI is matched and a peripheral area thereof.

Referring to FIG. 5D, the output controller 190 may constitute a GUI 545 that guides pedestrian detection information if the pedestrian 541 are detected from the front side. Then, the image correcting device 180 may correct the color of the peripheral area of the GUI 545 while considering the colors of the objects located around the host vehicle, that is, the front vehicles 542, 543, and 544 as well as the color of the road displayed on the screen of the head-up display (HUD) 15.

Accordingly, the output controller 190 may allow the driver to easily recognize the GUI 545 that warns a pedestrian by displaying the corrected GUI 545 on the screen of the head-up display (HUD) 15.

Figure 5E:
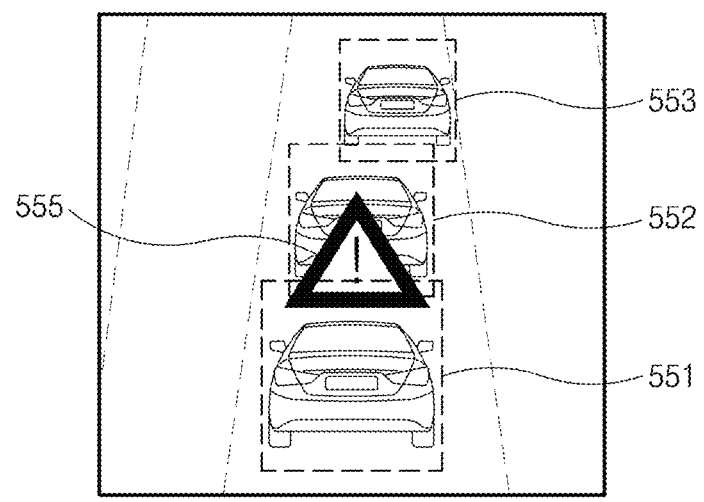
Figure 5F:
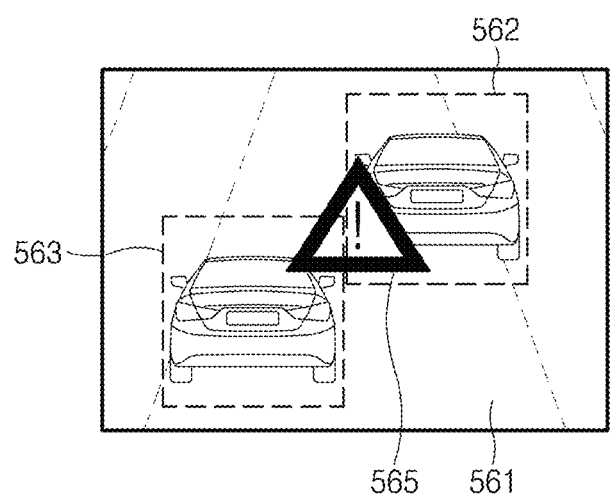

FIGS. 5E and 5F illustrate another form of correcting the color of the peripheral area of the GUI according to the mixed color of the plurality of background elements located in an area with which the GUI is matched.

Referring to FIG. 5E, the output controller 190 may constitute a GUI 555 that guides detection information of a plurality of front vehicles if the plurality of vehicles 551, 552, and 553 are detected from the front side. Then, the image correcting device 180 may correct the color of the peripheral area of the GUI 555 while considering all the mixed colors of the vehicles 551 and 552 located in an area, with which the GUI 555 is matched, on the screen of the head-up display (HUD) 15.

Accordingly, the output controller 190 may allow the driver to easily recognize the GUI 555 that guides detection information of the front vehicles by displaying the corrected GUI 555 on the screen of the head-up display (HUD) 15.

Further, referring to FIG. 5F, the output controller 190 may constitute a GUI 565 that guides detection information of a plurality of front vehicles if the plurality of vehicles 561 and 562 are detected from the front side. Then, the image correcting device 180 may correct the color of the peripheral area of the GUI 565 while considering all the mixed colors of the road and the vehicles 561 and 562 located in an area, with which the GUI 565 is matched, on the screen of the head-up display (HUD) 15.

Accordingly, the output controller 190 may allow the driver to easily recognize the GUI 565 that guides detection information of the front vehicles by displaying the corrected GUI 565 on the screen of the head-up display (HUD) 15.

FIGS. 5A to 5F are simply exemplary forms but the present disclosure is not limited thereto, but it is apparent that the color of the peripheral area (and the GUI image) may be variously corrected according to the color of the background element, the peripheral color, and/or the intensity of illumination and may be corrected by adding an effect image of various colors.

The apparatus 100, which is operated as mentioned above, may be realized in a form of a memory and a hardware device including a process that processes operations, and may be driven in a form in which the fuel cell life span predicting apparatus 100 is included in another hardware device, such as a microprocessor or a general-purpose computer system.

Further, an operational flow of the apparatus according to the present disclosure will be described in detail.

Figure 6:
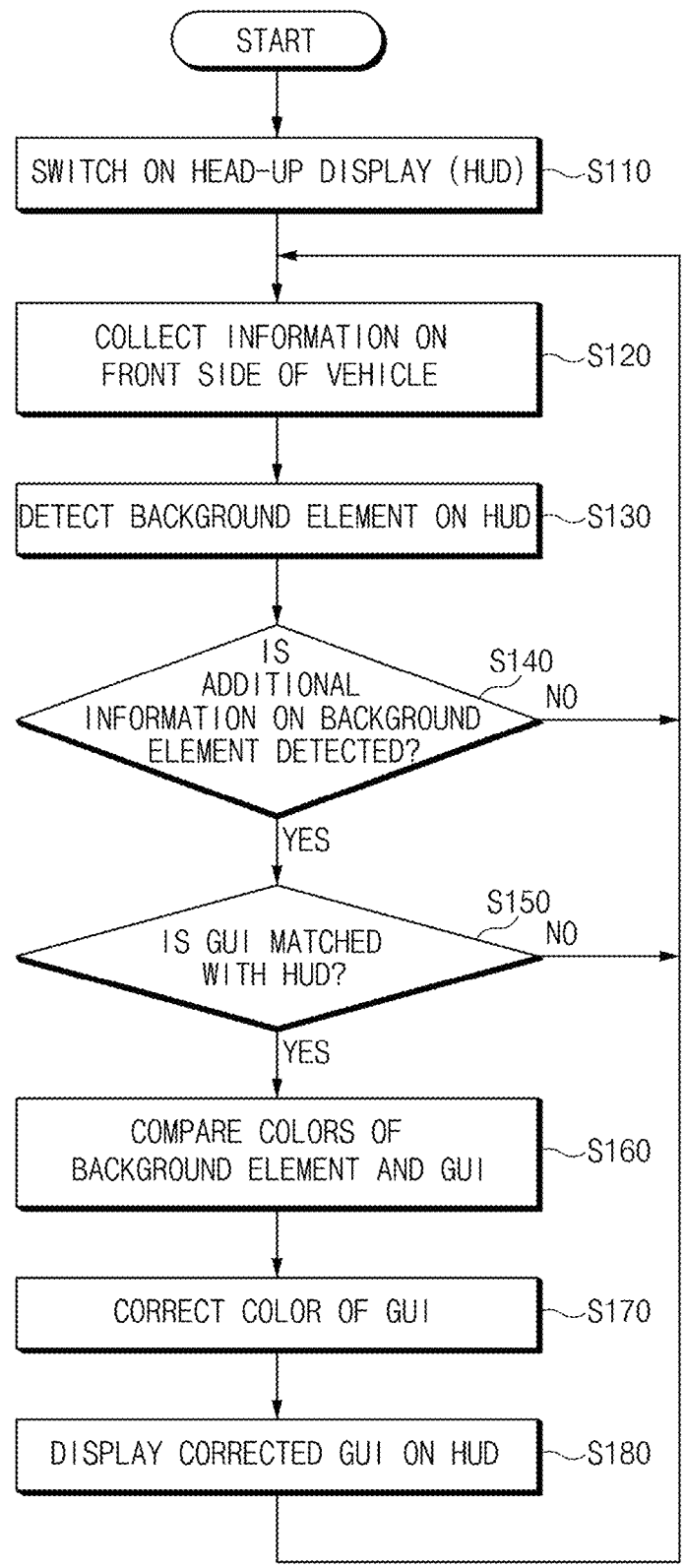
FIG. 6 is a flowchart illustrating an operation a method for controlling a display of a vehicle.

FIG. 6 is a flowchart illustrating an operation a method in one form of the present disclosure.

As illustrated in FIG. 6, the vehicle display control apparatus 100 collects environment information on the front side of the vehicle 10, for example, a front image of the vehicle, road and/or object information on the front side of the vehicle 10, road situation information on the front side of the vehicle 10, and information of an intensity of external illumination (S120) when the head-up display (HUD) 15 is switched on (S110).

Then, the vehicle display control apparatus 100 detects one or more background elements on the screen of the head-up display (HUD) 15 based on the information collected in operation S120 (S130). Here, the vehicle display control apparatus 100 may detect a road from the front image as a background element, and may detect a background element of an object, such as a pedestrian or an obstacle.

Further, the vehicle display control apparatus 100 may detect additional information on the one or more background elements detected in operation S130. As an example, the vehicle display control apparatus 100 may detect additional information, such as progress state information of the road, object warning information, and travel guide information according to detection of an object.

When additional information on the background element is detected (S140), the vehicle display control apparatus 100 may determine whether the detected additional information is to be matched with the head-up display (HUD) 15 to be displayed.

As an example, when a pedestrian was detected but a distance between the detected pedestrian and the vehicle 10 exceeds a reference range, the vehicle display control apparatus 100 may determine that the guide information corresponding to the detected object is not matched with the head-up display (HUD) 15. Further, when a pedestrian is detected in a reference range from the vehicle 10, the vehicle display control apparatus 100 may determine that the warning information corresponding to the detected object is matched with the head-up display (HUD) 15.

If it is not desired to match the information (S150), the vehicle display control apparatus 100 may maintain an existing display screen of the head-up display (HUD) 15.

Meanwhile, when it is desired to match the information (S150), the vehicle display control apparatus 100 outputs a GUI corresponding to the detected object (S155) and compares the colors of the one or more background elements and the color of the GUI (S160).

Then, the vehicle display control apparatus 100 may correct the color of the peripheral area of the GUI to the colors of the background elements or the mixed color of the two or more background element (S170), and may display the corrected GUI on the head-up display (HUD) 15 (S180). In operation 170, the vehicle display control apparatus 100 may correct the color of the GUI image as well as the peripheral area of the GUI to improve the visibility of the GUI.

Although not illustrated in FIG. 6, the vehicle display control apparatus 100 may correct the color of the peripheral area of the GUI by determining whether the intensity of external illumination exceeds a reference value in operation S170 and reflecting the information on the intensity of external illumination when the intensity of illumination exceeds the reference value.

Figure 7:
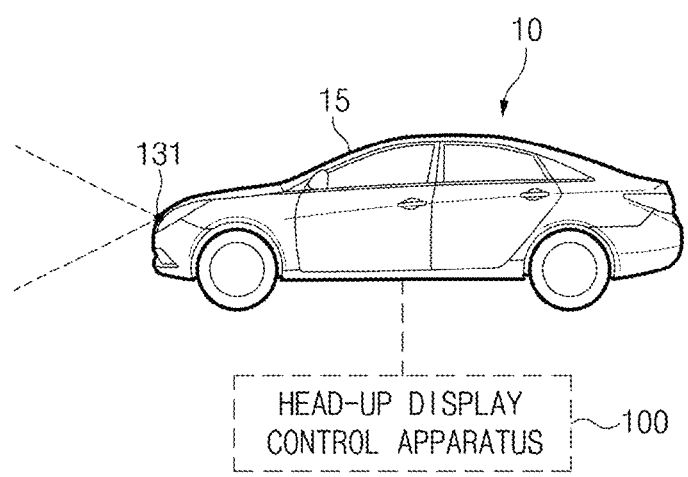
FIG. 7 is a view illustrating a vehicle system including a vehicle display control apparatus.

FIG. 7 illustrates a vehicle system including a vehicle display control apparatus in one form of the present disclosure.

Referring to FIG. 7, the vehicle system may include a head-up display (HUD) 15 disposed in a direction of attention of the driver in the vehicle 10, and a vehicle display control apparatus 100 that controls a display screen of the head-up display (HUD) 15.

The vehicle display control apparatus 100 may detect one or more background elements displayed on a screen of the head-up display (HUD) 15 based on an image obtained from a front camera 131 of the vehicle 10, and may detect color information on the detected background elements. The vehicle display control apparatus 100 may detect the background elements and the color information thereof by using sensors provided in the vehicle 10 in addition to the front camera 131. Further, the vehicle display control apparatus 100 may detect information on the intensity of illumination of the outside of the vehicle, and may detect bright information of the background elements due to the intensity of external illumination.

When information on the object detected from the front side of the vehicle 10, for example, a front vehicle, a pedestrian, and/or an obstacle is matched with the screen of the head-up display (HUD) 15, the vehicle display control apparatus 100 may constitute a GUI that guides object information and may correct the color of at least one element of the GUI according to the color of the background element of the head-up display (HUD) 15 to display the corrected color on the screen of the head-up display (HUD) 15.

Here, the vehicle display control apparatus 100 may correct the color of the periphery of the GUI while reflecting information on the intensity of external illumination or bright information of a background element due to the intensity of external illumination as well as the color of the background element of the head-up display (HUD) 15.

Further, the vehicle display control apparatus 100 may constitute the corresponding GUI and may correct the color of at least one element of the GUI according to the color and/or the intensity of external illumination of the background element of the head-up display (HUD) 15 to display the corrected color on the screen of the head-up display (HUD) 15 even in the case in which the front road guide information is matched with the screen of the head-up display (HUD) 15.

Here, the vehicle display control apparatus 100 corresponds to the apparatus of FIGS. 1 to 6. Accordingly, the forms of FIGS. 1 to 6 will be referenced for the description of the details of the vehicle display control apparatus 100.

The vehicle display control apparatus 100 according to the present disclosure may be realized in the interior of the vehicle 10. Then, the vehicle display control apparatus 100 may be integrally formed with control units in the interior of the vehicle 10, and may be embodied as a separate apparatus to be connected to the control units of the vehicle 10 by a separate connection unit. Here, the vehicle display control apparatus 100 may be operated in conjunction with the sensors and/or the navigation system in the vehicle.

Figure 8:
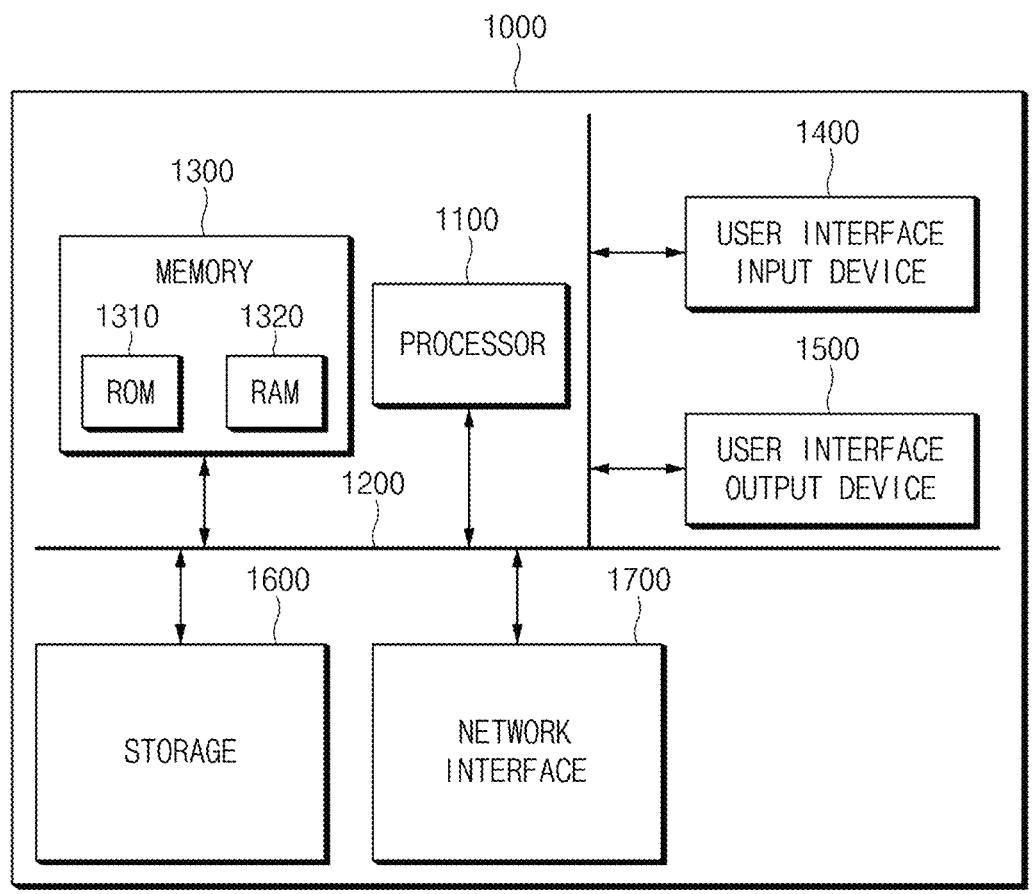
FIG. 8 is a block diagram illustrating a computing system that executes the method.

FIG. 8 is a block diagram illustrating a computing system that executes the method in one form of the present disclosure.

Referring to FIG. 8, the computing system 1000 may include at least one processor 1100 connected through a bus 1200, a memory 1300, a user interface input device 1400, a user interface output device 1500, a storage 1600, and a network interface 1700.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM) 1310 and a random access memory (RAM) 1320.

Accordingly, the steps of the method or algorithm described in relation to the forms of the present disclosure may be implemented directly by hardware executed by the processor 1100, a software module, or a combination thereof. The software module may reside in a storage medium (that is, the memory 1300 and/or the storage 1600), such as a RAM memory, a flash memory, a ROM memory, an EPROM memory, an EEPROM memory, a register, a hard disk, a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to one aspect of the present disclosure, the visibility of the GUI may be improved by correcting the color of the periphery of the GUI based on the colors and/or the intensities of external illumination of the background elements on the head-up display (HUD) or the color and/or the intensity of external illumination of the mixed background element and displaying the corrected color on the head-up display.

Further, the present disclosure improves the aesthetic aspect of the GUI by adding an effect image having a specific color to the periphery of the GUI based on the colors of the background elements on the head-up display (HUD) or the color of the mixed background element.

The above description is a simple exemplification of the technical spirit of the present disclosure, and the present disclosure may be variously corrected and modified by those skilled in the art to which the present disclosure pertains without departing from the desired features of the present disclosure.

Therefore, the disclosed forms of the present disclosure do not limit the technical spirit of the present disclosure but are illustrative, and the scope of the technical spirit of the present disclosure is not limited by the exemplary forms of the present disclosure. And it will be understood that all the technical spirits within the equivalent range fall within the scope of the present disclosure.

What is claimed is:

1. An apparatus for controlling a display of a vehicle, the apparatus comprising:
a detector configured to detect a background element on a head-up display and to detect additional information and color information of the detected background element;
a determination device configured to, when the additional information of the detected background element is matched with the head-up display, compare color information of a graphic user interface (GUI) corresponding to the additional information of the detected background element with the color information of the detected background element;
an image correcting device configured to correct a color of an element of the GUI based on a comparison result; and
an output controller configured to output a corrected GUI corresponding to the additional information,
wherein:
the corrected GUI includes the one element having the corrected color, and the output controller is configured to display the corrected GUI on the head-up display,
the GUI includes a GUI element corresponding to a peripheral area of a GUI image, and
the image correcting device is configured to correct a color of the GUI element corresponding to the peripheral area.

2. The apparatus of claim 1, wherein the GUI includes:
the GUI image, and the GUI element corresponding to the peripheral area of the GUI image, and
wherein the image correcting device is configured to correct a color of an internal area defined by the peripheral area in the GUI image.

3. The apparatus of claim 1, wherein the image correcting device is configured to correct the color of the element of the GUI when a difference between the GUI color information of the additional information of the detected background element and the color information of the detected background element is within a reference range.

4. The apparatus of claim 1, wherein the image correcting device is configured to correct a color of an element of the GUI based on the color information of the detected background element.

5. The apparatus of claim 1, wherein the detector is configured to detect a road image from a front image and detect color information of a road from the road image.

6. The apparatus of claim 1, wherein the detector is configured to detect an object image from a front image and detect color information of an object from the object image.

7. The apparatus of claim 1, wherein the additional information of the detected background element includes at least one of progress state information of a road, object detection guide information, or travel guide information based on detection of an object.

8. The apparatus of claim 1, wherein the detector is configured to detect the additional information on the background element from at least one sensor or a navigation system.

9. The apparatus of claim 1, wherein the detector is configured to detect information on an intensity of external illumination, and
wherein the image correcting device is configured to correct the color of the element of the GUI based on at least one of the color information of the GUI on the detected background element or the information on the intensity of external illumination.

10. A method for controlling a display of a vehicle, the method comprising the steps of:
detecting, by a detector, a background element on a head-up display and detecting additional information and color information of the detected background element;

when the additional information of the detected background element is matched with the head-up display, comparing, by a determination device, color information of a graphic user interface (GUI) corresponding to the additional information of the detected background element with the color information of the detected background element;

correcting, by an image correcting device, a color of an element of the GUI based on a comparison result; and displaying, by an output controller, a corrected GUI including the corrected color on the head-up display, wherein the correcting of the color includes:
adding an effect image of a color contrasted with the color of the detected background element to the GUI.

11. The method of claim 10, wherein the GUI includes:
a GUI element corresponding to a peripheral area of a GUI image, and
wherein the correcting of the color includes correcting a color of the GUI element corresponding to the peripheral area.

12. The method of claim 10, wherein the GUI includes:
a GUI image, and a GUI element corresponding to a peripheral area of the GUI image, and
wherein the correcting of the color includes:
correcting a color of the GUI element corresponding to the peripheral area.

13. The method of claim 10, wherein the correcting of the color includes:
correcting the color of the element of the GUI when a difference between the GUI color information of the additional information of the detected background element and the color information of the detected background element is within a reference range.

14. The method of claim 10, wherein the correcting of the color includes:
correcting a color of a periphery of the GUI based on information on a mixed color of at least two background elements.

15. The method of claim 10, wherein the detecting of the additional information and the color information includes:
detecting a road image from a front image; and
detecting color information of a road from the road image.

16. The method of claim 10, wherein the detecting of the additional information and the color information includes:
detecting an object image from a front image of the vehicle; and
detecting color information of an object from the object image.

17. The method of claim 10, wherein the detecting of the additional information and the color information includes:
detecting the additional information on the background element from at least one sensor or a navigation system.

18. The method of claim 10, further comprising:
detecting information on an intensity of external illumination,
wherein the correcting of the color of the GUI includes:
correcting the color of the element of the GUI based on at least one of the color information of the GUI on the detected background element or the information on the intensity of external illumination.

19. A vehicle system comprising:
a head-up display; and
a display control apparatus, wherein the display control apparatus is configured to detect additional information and color information of a background element on the head up display;

wherein when the additional information on the detected background element is matched with the head-up display, the display control apparatus is configured to correct a color of an element of a graphic user interface (GUI) corresponding to the additional information by comparing color information of the element of the GUI with the color information of the detected background element; and wherein the display control apparatus is configured to correct the color of the element of the GUI by adding an effect image of a color contrasted with a color of the detected background element to the GUI.

20. A method for controlling a display of a vehicle, the method comprising the steps of:

detecting, by a detector, a background element on a head-up display and detecting additional information and color information of the detected background element;

when the additional information of the detected background element is matched with the head-up display, comparing, by a determination device, color information of a graphic user interface (GUI) corresponding to the additional information of the detected background element with the color information of the detected background element;

correcting, by an image correcting device, a color of an element of the GUI based on a comparison result;

displaying, by an output controller, a corrected GUI including the corrected color on the head-up display; and correcting a color of a periphery of the GUI based on color information of the detected background element.

21. An apparatus for controlling a display of a vehicle, the apparatus comprising:

a detector configured to detect a background element on a head-up display and to detect additional information and color information of the detected background element;

a determination device configured to, when the additional information of the detected background element is matched with the head-up display, compare color information of a graphic user interface (GUI) corresponding to the additional information of the detected background element with the color information of the detected background element;

an image correcting device configured to correct a color of an element of the GUI based on a comparison result; and an output controller configured to output a corrected GUI corresponding to the additional information, wherein:
the corrected GUI includes the one element having the corrected color,
the output controller is configured to display the corrected GUI on the head-up display, and
the image correcting device is configured to correct a color of an element of the GUI based on information on a mixed color of at least two background elements.

* * * * *